United States Patent
Felt (10) Patent No.: US 10,120,529 B2
(45) Date of Patent: Nov. 6, 2018

(54) TOUCH-ACTIVATED AND EXPANDABLE VISUAL NAVIGATION OF A MOBILE DEVICE VIA A GRAPHIC SELECTION ELEMENT

(71) Applicant: Verizon Patent and Licensing Inc., Arlington, VA (US)

(72) Inventor: Michelle Felt, Randolph, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 435 days.

(21) Appl. No.: 14/326,094

(22) Filed: Jul. 8, 2014

(65) Prior Publication Data

US 2016/0011726 A1    Jan. 14, 2016

(51) Int. Cl.
*G06F 3/0482* (2013.01)
*G06F 3/0488* (2013.01)

(52) U.S. Cl.
CPC ........ *G06F 3/0482* (2013.01); *G06F 3/04883* (2013.01); *G06F 3/04886* (2013.01)

(58) Field of Classification Search
CPC .................................................. G06F 3/0482
See application file for complete search history.

(56) References Cited

U.S. PATENT DOCUMENTS

| | | | |
|---|---|---|---|
| D385,545 S | 10/1997 | Levin | |
| D396,455 S | 7/1998 | Bier | |
| D397,101 S | 8/1998 | Bier | |
| 5,790,820 A | * 8/1998 | Vayda | G06F 3/0482 715/834 |
| 5,914,717 A | * 6/1999 | Kleewein | G09G 5/14 345/473 |
| D423,484 S | 4/2000 | Dangelmaier et al. | |
| D436,599 S | 1/2001 | Greene | |
| D439,584 S | 3/2001 | Wang et al. | |
| D440,575 S | 4/2001 | Wang et al. | |
| D453,167 S | 1/2002 | Hasegawa et al. | |
| 6,549,219 B2 | 4/2003 | Selker | |
| D474,195 S | 5/2003 | Kates et al. | |
| D478,912 S | 8/2003 | Johnson | |
| D494,186 S | 8/2004 | Johnson | |
| D500,766 S | 1/2005 | Hanisch et al. | |
| D521,019 S | 5/2006 | Ording | |
| D523,871 S | 6/2006 | Hally et al. | |

(Continued)

OTHER PUBLICATIONS

Rosenthal, "All Things Considered image", My Kingdom for Some Structure, Napkin #2—All Things Considered image, http://transom.org/2013/my-kingdom-for-some-structure/, by Rob Rosenthal, posted Mar. 27, 2013.

*Primary Examiner* — Jennifer To
*Assistant Examiner* — Joseph R Burwell (57) ABSTRACT

A system may include a touchscreen and a computing device executing an application. The application displays on the touch screen a navigation area including a centrally disposed selection element. There is a first display area in the navigation area, wherein the first display area shows a first menu item from a list of menu items. The application changes the first display area, when a next menu select action is detected based on interactions with the touch screen, to show a second menu item from the list of menu items, where in the information on the touch screen is updated to corresponds to the second menu item.

21 Claims, 7 Drawing Sheets

(56) References Cited

U.S. PATENT DOCUMENTS

| | | |
|---|---|---|
| D524,321 S | 7/2006 | Hally et al. |
| D525,984 S | 8/2006 | Hally et al. |
| D528,559 S | 9/2006 | Hally et al. |
| D538,296 S | 3/2007 | Sadler et al. |
| D540,811 S | 4/2007 | Sadler et al. |
| D544,495 S | 6/2007 | Evans et al. |
| D550,691 S | 9/2007 | Hally et al. |
| D550,696 S | 9/2007 | Kortum et al. |
| D564,531 S | 3/2008 | Sadler |
| D570,861 S | 6/2008 | Sadler et al. |
| D573,153 S | 7/2008 | Roever et al. |
| D576,170 S | 9/2008 | Sadler et al. |
| D586,359 S | 2/2009 | Makoski et al. |
| D588,154 S | 3/2009 | Bouchard et al. |
| D595,309 S | 6/2009 | Sasaki et al. |
| D602,033 S | 10/2009 | Vu et al. |
| 7,665,036 B1 * | 2/2010 | Lin ................ G06F 3/0481 715/201 |
| D619,614 S | 7/2010 | O'Mullan et al. |
| D626,133 S | 10/2010 | Murphy et al. |
| D629,814 S | 12/2010 | Lew |
| D630,649 S | 1/2011 | Tokunaga et al. |
| D644,243 S | 8/2011 | Matas |
| D648,341 S | 11/2011 | Chen |
| D650,800 S | 12/2011 | Impas et al. |
| D652,051 S | 1/2012 | Judy et al. |
| D655,300 S | 3/2012 | Jones et al. |
| D665,407 S | 8/2012 | Bitran et al. |
| D667,019 S | 9/2012 | Chaudhri |
| D670,726 S | 11/2012 | Bitran et al. |
| D677,180 S | 3/2013 | Plitkins et al. |
| D681,649 S | 5/2013 | Fletcher et al. |
| D681,653 S | 5/2013 | Bitran et al. |
| D687,045 S | 7/2013 | Plitkins et al. |
| D687,063 S | 7/2013 | Myung et al. |
| D689,085 S | 9/2013 | Pasceri et al. |
| D689,509 S | 9/2013 | Convay et al. |
| D689,511 S | 9/2013 | Convay et al. |
| D689,874 S | 9/2013 | Brinda et al. |
| D690,318 S | 9/2013 | Kluttz et al. |
| D691,171 S | 10/2013 | Brinda et al. |
| D691,629 S | 10/2013 | Matas et al. |
| D693,837 S | 11/2013 | Bouchier |
| 8,605,094 B1 | 12/2013 | Alfaro et al. |
| D697,526 S | 1/2014 | Bruck et al. |
| D697,937 S | 1/2014 | Lee et al. |
| D697,940 S | 1/2014 | Bitran et al. |
| D699,747 S | 2/2014 | Pearson et al. |
| D701,231 S | 3/2014 | Lee |
| D702,251 S | 4/2014 | Kotler et al. |
| D704,207 S | 5/2014 | Lee et al. |
| D705,251 S | 5/2014 | Pearson et al. |
| D706,803 S | 6/2014 | Rogowski et al. |
| D706,814 S | 6/2014 | Phelan |
| D708,199 S | 7/2014 | Molaro et al. |
| D711,394 S | 8/2014 | Hanson et al. |
| D714,340 S | 9/2014 | Mason |
| D714,810 S | 10/2014 | Lee et al. |
| D715,313 S | 10/2014 | Hontz |
| D715,824 S | 10/2014 | Molaro et al. |
| D716,316 S | 10/2014 | Behzadi et al. |
| D718,320 S | 11/2014 | Charles et al. |
| D718,321 S | 11/2014 | Charles et al. |
| D719,180 S | 12/2014 | Liang |
| D720,361 S | 12/2014 | Mitchell et al. |
| D720,366 S | 12/2014 | Hiltunen et al. |
| 8,907,952 B2 | 12/2014 | Hautvast |
| D721,089 S | 1/2015 | Brinda et al. |
| D722,079 S | 2/2015 | Charles et al. |
| D722,606 S | 2/2015 | Stroupe et al. |
| D724,100 S | 3/2015 | Williams et al. |
| D724,603 S | 3/2015 | Williams et al. |
| D724,618 S | 3/2015 | Shin |
| D724,619 S | 3/2015 | Nguyen |
| D726,197 S | 4/2015 | Kim et al. |
| D726,216 S | 4/2015 | Tabata et al. |
| D726,218 S | 4/2015 | Marianek et al. |
| D729,834 S | 5/2015 | Rezende et al. |
| D730,367 S | 5/2015 | Ryan et al. |
| D730,377 S | 5/2015 | Clare |
| D730,378 S | 5/2015 | Xiong et al. |
| D730,379 S | 5/2015 | Xiong et al. |
| 9,024,954 B2 | 5/2015 | Nations et al. |
| D730,917 S | 6/2015 | Lee et al. |
| D732,566 S | 6/2015 | Mitchell et al. |
| D735,733 S | 8/2015 | Hontz |
| D736,231 S | 8/2015 | Gottschlag et al. |
| D736,780 S | 8/2015 | Wang |
| D736,792 S | 8/2015 | Brinda et al. |
| D736,810 S | 8/2015 | Hisada et al. |
| D737,279 S | 8/2015 | Taniuchi et al. |
| D738,901 S | 9/2015 | Amin |
| D740,308 S | 10/2015 | Kim et al. |
| D740,846 S | 10/2015 | Mitchell et al. |
| D741,341 S | 10/2015 | Lee et al. |
| D741,356 S | 10/2015 | Park et al. |
| D741,890 S | 10/2015 | Chaudhri et al. |
| D741,896 S | 10/2015 | Park et al. |
| D742,408 S | 11/2015 | Park |
| D743,416 S | 11/2015 | Lim et al. |
| D743,440 S | 11/2015 | Bachman et al. |
| D743,986 S | 11/2015 | Pan et al. |
| D744,505 S | 12/2015 | Wilberding et al. |
| D745,533 S | 12/2015 | Luo |
| D747,732 S | 1/2016 | Scalisi |
| 9,237,318 B2 | 1/2016 | Kasmir et al. |
| D749,107 S | 2/2016 | Amiya |
| D750,102 S | 2/2016 | Bates et al. |
| D750,125 S | 2/2016 | Yang et al. |
| D752,060 S | 3/2016 | Kim et al. |
| D753,131 S | 4/2016 | Cuthbert et al. |
| D753,132 S | 4/2016 | Cuthbert et al. |
| D753,152 S | 4/2016 | Moon et al. |
| D753,702 S | 4/2016 | Zhou |
| D753,708 S | 4/2016 | Yang et al. |
| D753,712 S | 4/2016 | Lee |
| D754,175 S | 4/2016 | Kim |
| D754,184 S | 4/2016 | Ng et al. |
| D754,685 S | 4/2016 | Carlton et al. |
| D754,699 S | 4/2016 | Lee et al. |
| D754,711 S | 4/2016 | Herold et al. |
| D755,215 S | 5/2016 | Lee et al. |
| D755,216 S | 5/2016 | Lee et al. |
| D755,819 S | 5/2016 | Gao et al. |
| D755,821 S | 5/2016 | Lee et al. |
| D756,398 S | 5/2016 | Ng |
| D757,750 S | 5/2016 | Tedesco et al. |
| D757,753 S | 5/2016 | Jung |
| D757,774 S | 5/2016 | Iwamoto |
| D757,775 S | 5/2016 | Iwamoto |
| D758,402 S | 6/2016 | Jeon et al. |
| D759,079 S | 6/2016 | Carlton et al. |
| D759,080 S | 6/2016 | Luo et al. |
| D759,679 S | 6/2016 | Behar |
| D759,680 S | 6/2016 | Behar |
| D759,681 S | 6/2016 | Behar |
| D759,684 S | 6/2016 | Bijlani et al. |
| D759,702 S | 6/2016 | Scalisi et al. |
| D759,714 S | 6/2016 | Behar |
| D760,250 S | 6/2016 | Myung et al. |
| D760,251 S | 6/2016 | Myung et al. |
| D760,263 S | 6/2016 | Ta |
| D760,266 S | 6/2016 | Beaty et al. |
| D760,739 S | 7/2016 | Jung et al. |
| D760,769 S | 7/2016 | Ishii et al. |
| D760,785 S | 7/2016 | Kim et al. |
| D760,795 S | 7/2016 | Barajas et al. |
| D762,664 S | 8/2016 | Lee et al. |
| D763,294 S | 8/2016 | Amin et al. |
| D764,512 S * | 8/2016 | McNeil ................ D14/486 |
| D765,102 S | 8/2016 | Lee et al. |
| D765,109 S | 8/2016 | Kim et al. |
| D765,115 S | 8/2016 | Pierson et al. |
| D765,669 S | 9/2016 | Shaw |

(56) References Cited

U.S. PATENT DOCUMENTS

| | | |
|---|---|---|
| D766,270 S | 9/2016 | Gandhi et al. |
| D766,282 S | 9/2016 | Kaplan et al. |
| D766,959 S | 9/2016 | Valade et al. |
| D768,143 S | 10/2016 | Drozd et al. |
| D768,148 S | 10/2016 | Jung et al. |
| D768,189 S | 10/2016 | Valade et al. |
| D768,191 S | 10/2016 | Do et al. |
| D768,702 S | 10/2016 | Ford |
| D769,885 S | 10/2016 | Zhu et al. |
| D770,470 S | 11/2016 | Jin |
| D771,136 S | 11/2016 | Lee et al. |
| D772,297 S | 11/2016 | Chaudhri et al. |
| D773,487 S | 12/2016 | Colley et al. |
| D774,064 S | 12/2016 | Liu et al. |
| D775,165 S | 12/2016 | Sun |
| D775,196 S | 12/2016 | Huang et al. |
| D777,179 S | 1/2017 | Burns |
| D777,180 S | 1/2017 | Kim et al. |
| D777,182 S | 1/2017 | Holm et al. |
| D777,183 S | 1/2017 | Chevrier et al. |
| D777,186 S | 1/2017 | Armstrong |
| D778,308 S | 2/2017 | Wang et al. |
| D778,941 S | 2/2017 | Coffman et al. |
| D778,942 S | 2/2017 | Coffman et al. |
| D781,299 S | 3/2017 | Yun et al. |
| D783,030 S | 4/2017 | Lee et al. |
| D784,383 S | 4/2017 | Hong et al. |
| D785,012 S | 4/2017 | Jou |
| 9,619,118 B2 | 4/2017 | Vakharia et al. |
| D786,274 S | 5/2017 | Lee et al. |
| D787,553 S | 5/2017 | Maccubbin et al. |
| D788,157 S | 5/2017 | Kim et al. |
| D789,404 S | 6/2017 | Modestine et al. |
| D789,962 S | 6/2017 | Lee et al. |
| D791,165 S | 7/2017 | Modestine et al. |
| D792,431 S | 7/2017 | Grassle et al. |
| 2002/0105534 A1 | 8/2002 | Balassanian |
| 2004/0008224 A1 | 1/2004 | Molander et al. |
| 2005/0010955 A1 | 1/2005 | Elia et al. |
| 2006/0012572 A1* | 1/2006 | Sakurai .......... G06F 3/0482 345/157 |
| 2008/0052640 A1* | 2/2008 | Kraft .......... G06F 3/0338 715/811 |
| 2009/0019397 A1 | 1/2009 | Buffet et al. |
| 2009/0037813 A1* | 2/2009 | Newman .......... G06F 3/04883 715/702 |
| 2009/0083662 A1 | 3/2009 | Fitzmaurice et al. |
| 2009/0183100 A1* | 7/2009 | Eom .......... G06F 3/0482 715/769 |
| 2010/0174987 A1 | 7/2010 | Shin et al. |
| 2010/0229130 A1* | 9/2010 | Edge .......... G06F 3/04886 715/863 |
| 2010/0259375 A1 | 10/2010 | Ferren et al. |
| 2011/0004835 A1 | 1/2011 | Yanchar et al. |
| 2011/0055760 A1* | 3/2011 | Drayton .......... G06F 3/0482 715/834 |
| 2011/0167392 A1* | 7/2011 | Dicke .......... G01C 21/3667 715/864 |
| 2011/0202879 A1* | 8/2011 | Stovicek .......... G06F 3/0482 715/828 |
| 2012/0113147 A1 | 5/2012 | Virtanen et al. |
| 2012/0124520 A1 | 5/2012 | Samp et al. |
| 2012/0179965 A1* | 7/2012 | Taylor .......... G06F 3/04883 715/705 |
| 2012/0203379 A1 | 8/2012 | Sloo et al. |
| 2013/0132887 A1 | 5/2013 | Amin et al. |
| 2013/0144674 A1* | 6/2013 | Kim .......... G06Q 30/0267 705/7.19 |
| 2013/0227433 A1* | 8/2013 | Doray .......... G06F 3/0482 715/753 |
| 2014/0137020 A1* | 5/2014 | Sharma .......... G06F 3/0486 715/769 |
| 2014/0214640 A1 | 7/2014 | Mallikarjunan et al. |
| 2014/0250410 A1* | 9/2014 | Eaves .......... G06F 3/0485 715/810 |
| 2014/0279584 A1 | 9/2014 | Lee et al. |
| 2014/0282075 A1 | 9/2014 | Alfaro |
| 2015/0155917 A1 | 6/2015 | Won |
| 2015/0188720 A1 | 7/2015 | Winter |
| 2015/0212719 A1 | 7/2015 | Gottschlag et al. |

\* cited by examiner

TOUCH-ACTIVATED AND EXPANDABLE VISUAL NAVIGATION OF A MOBILE DEVICE VIA A GRAPHIC SELECTION ELEMENT

BACKGROUND

Mobile computing devices such as smart phones have increased in functionality and capabilities. As providers have added more features to the mobile devices, the ability to navigate and access all of those features has become cumbersome. Often it is not possible to navigate the complicated layouts of the screens without detailed study of the menus and two hands, one holding the device and the other interacting with all the various small menus and icons. In addition often lost in the clutter is important information that the user should be aware of such as approaching monthly minute limits or the existence of an overdue bill. What is desired is an easy way for users to navigate the varied features and to be notified of the important information that needs their attention.

DETAILED DESCRIPTION

The problem of making it easier for a user to navigate the applications on a mobile device incorporating a computing device is solved by providing a navigation area with a centrally disposed selection element, such as a circle, which attracts the attention of the user and invites the user's interaction with tab that is depicted as lifting off the screen's surface. Touch the lifting tab can flip the tab to reveal or activate electronically the next menu item on a list of menu items. The centrally disposed selection element may include a top or upper portion and a bottom or lower portion, where the top portion has a menu icon and the bottom portion displays a current menu title. The navigation area may provide a border between the top or upper portion and the lower or bottom area, such that the border graphically bisects said user interface. Tapping on the current menu title may provide an engaging animated transition to activate electronically the next menu item title. In one illustrative approach, a flip animation effect can resemble the flipping of a piece of paper to activate electronically by revealing the next menu item. Tapping the menu icon in the top portion of the circle may cause the navigation area to activate electronically by expanding to a larger navigation area and present the list of additional and in some cases all the menu items. Selecting a menu item from the presented menu items may electronically activate to collapse the larger navigation area to the original navigation area with the centrally disposed selection element showing the selected menu title in the bottom portion.

In addition to menu navigation functionality, a substantially centrally disposed selection element can display alert information either as an alert icon or as an alert message. Alert mechanisms that may be used in addition to or in place of an alert icon or an alert message may include a color change of the display, which may include the entire display, as well as one or more corresponding audible or vibrational alert. For example, an alert could be regarding an overdue bill. The display screen may show information relevant to the alert, for example displaying the account summary tab that shows the dollar amount of outstanding bill when the alert is regarding an overdue bill. Alternatively, the alert may be an alert icon to select to view a detailed alert message.

Figure 1A:
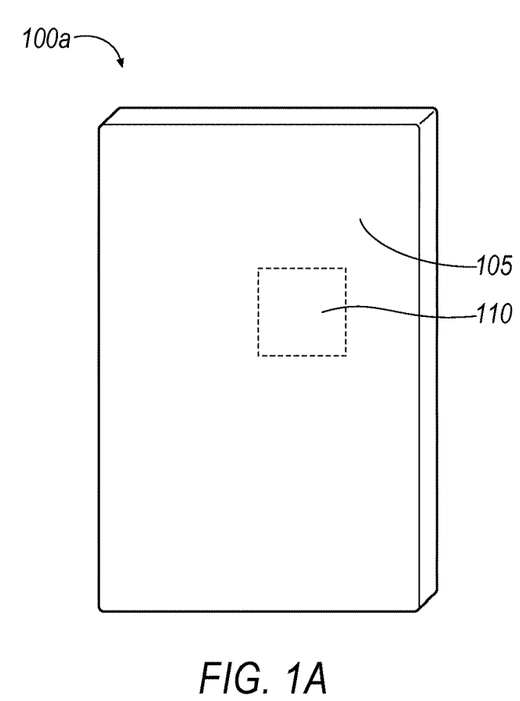
FIGS. 1A and 1B illustrate an exemplary system for a visual application navigation.
Figure 1B:
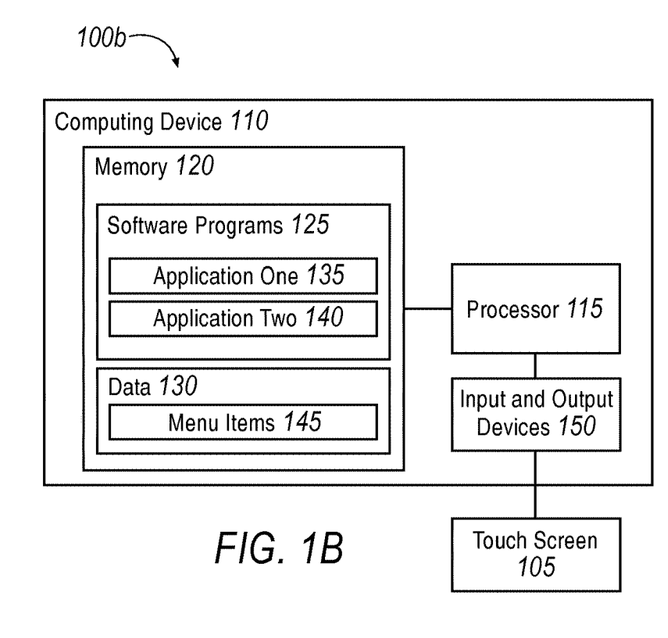

FIGS. 1A and 1B illustrate an exemplary visual application navigation system implemented on a mobile device 100a having a touch screen 105 and incorporating a computing device 110 with components as shown in block diagram 100b. The visual application navigation system may take many different forms and may include multiple and/or alternate components and facilities. While an exemplary visual application navigation system is shown in FIGS. 1A and 1B, the exemplary components illustrated in the Figures are not intended to be limiting. Indeed, additional or alternative components and/or implementations may be used.

As illustrated in FIGS. 1A and 1B, the visual application navigation system includes a touch screen 105 that incorporates a user interface with a touch sensitive display. The touch screen 105 allows the display of images and provides input indicating touch interactions with the screen that correspond to the displayed images. Touch screen 105 may be similar to touch screens commonly found on smart phones and tablet computers. The touch screen may sense interactions with the screen using various technologies such as pressure sensitivity, measuring capacitance, measuring inductance and various other technologies used in touch screens.

The computing device 110 includes a memory 120, a processor 115 in communication with the touchscreen 105 via various input output devices 150. The memory 120 includes both software programs 125 and data 130. The software programs 125 may include a first application 130 (also referred to as the application) and a second application 135. The data 130 may include a list of menu items 145.

The software programs 125, e.g. the first and second applications 135 and 140, are preferably provided as software stored on a computer-readable medium that when executed by the processor 110 provides the operations described herein. Alternatively, the software programs 120 and its first and second application 135 and 140 may be provided as hardware or firmware, or combinations of software, hardware and/or firmware. Additionally, although one example of the modularization of the software program 120 is illustrated and described as a first and second application, it should be understood that the operations thereof may be provided by fewer, greater, or differently named modules.

The data 130 may include a list of menu items 145 that is used by an application, for example application 135.

In general, computing systems and/or devices, such as computing device 110, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as the computing device 110 generally include computer-executable instructions such as the instructions of the first application 135 and the second application 140, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
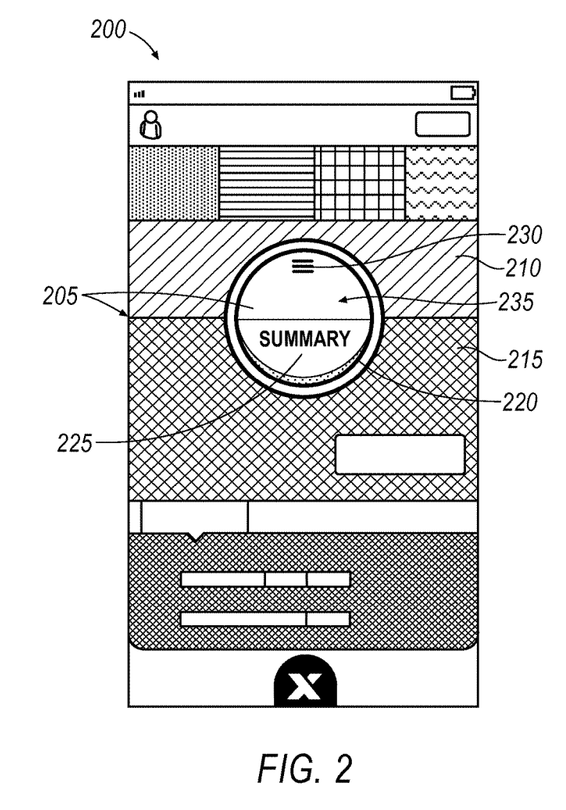
FIG. 2 illustrates a screen layout that includes a first exemplary illustration of a navigation area.

FIG. 2 illustrates a screen layout 200 that the processor 115 may produce when executing the application 135. The screen layout 200 includes a first exemplary illustration of a navigation area 205, which separates a top screen portion 210 and a bottom screen portion 215. The navigation area 205 includes a centrally disposed selection element that is illustrated in this approach as a circular element 220, which generally may be or at least in part comprise rounded, elliptical, or otherwise curvi-linearly shaped graphical object that facilitates graphical touch access by the user. The navigation area 205 may display a menu interface 235 or an alert as discussed below.

The navigation area 205 as a menu interface 235 may include a bottom portion being a menu display area 225 and a top portion with a menu icon 230. The menu display area 225 may give the appearance of a piece of paper that is starting to flip upwards. The processor 115 executing the application 135 may interpret a tap or touch on the menu display area 225 as a next touch action. Alternatively the processor executing the application 135 may interpret an upward brushing motion (that is a contact or touch on the touch sensitive screen moving upward) on any portion of the navigation area 205 as the next menu touch action. The next menu touch action may cause the processor 115 executing on the application 135 to execute the flip animation effect to unveil the title of the next menu item in the menu display area 225. In addition, the processor 115 running the application 135 may update the content of screen to corresponding to the next menu item.

The processor 115 executing the application 135 may detect an expand touch action when the menu icon 230 is selected or a downward stroke is detected. The processor 115 executing application 135 may then animate an expand animation effect in which the navigation area 205 expands into a larger navigation area 305 that shows the list of menu items 145 as shown in screen layout 300 of FIG. 3.

Figure 3:
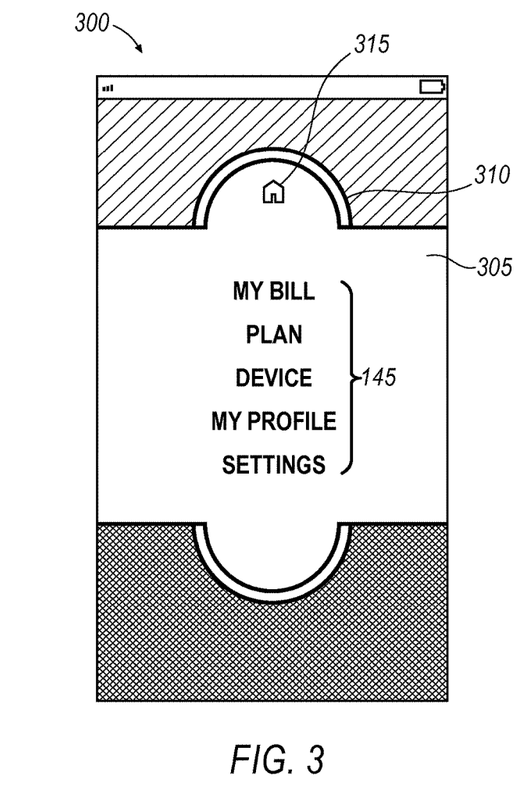
FIG. 3 illustrates a screen layout that includes a larger navigation area of the first exemplary illustration.

FIG. 3 illustrates a screen layout 300 showing a larger navigation area 305 with the menu items 145 that may be produced by the processor 115 executing the application 135. The larger navigation area 305 is illustrated as being more rectangular shaped and at the top of the rectangular shape is a half circle 310 with a home icon 315. The processor 115 executing the application 135 may detect a collapse touch action when a selection of the home icon 315 is detected. Alternatively, when a upwards stroke is detected over the navigation area 305 or some smaller portion of the navigation area 305, for example the home icon 315, or just any upward stroke anywhere on the user input screen 105 may be defined as the collapse touch action. The collapse touch action may cause the larger navigation area to reduce in size and return to the original navigation area shape 205. When processor 115 detects a menu icon selected from the menu list 145, the processor 115 executing the application 135 may animate the reduction in size of the larger navigation area 305 to its original navigation area shape 205 with the selected menu item displayed in the menu display area 225.

With the navigation area 205 that is displaying the menu interface 235 being located centrally and allowing tapping to scroll through the menu items and a simple up or down motion to expand and collapse the menu, the menu interface 235 enables a user of the mobile device 100a to interact fully with the navigation while holding the device 100a with just one hand. For example, the device may be held in the palm of the hand and just the thumb on the same hand can easily navigate the menu for the application 135.

Figure 4:
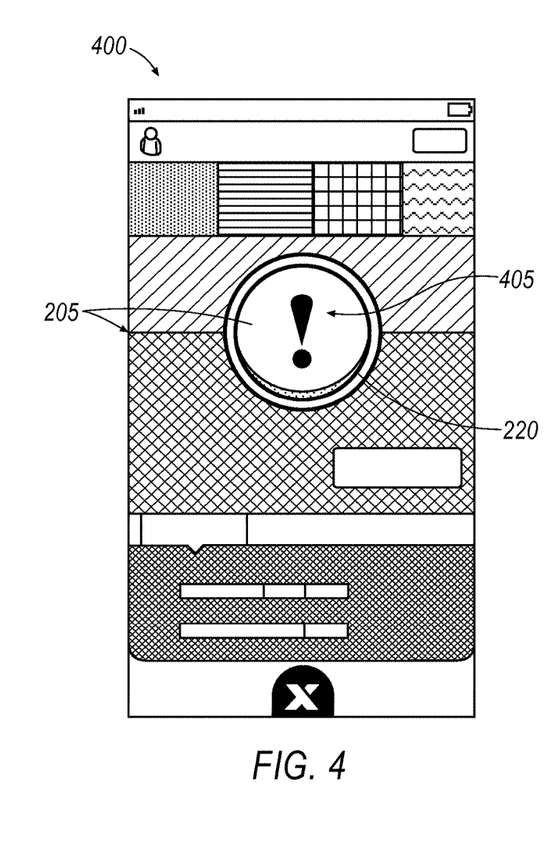
FIG. 4 illustrates a screen layout for the first exemplary illustration of the navigation area where a centrally disposed selection element shows an alert icon.

FIG. 4 illustrates a screen layout 400 for the first exemplary illustration of the navigation area 205 where the centrally disposed selection element 220 shows an alert, specifically an alert symbol 405, which may be produced by the processor 115 when executing the application 135. In addition to showing the alert symbol 405, at least a portion of the screen may change color to draw more attention to the alert. The portion of the screen that changes color may be the area adjacent to the centrally disposed selection element 220. Alternatively, the portion of the screen that changes color may be the entire screen, for example the screen could change entirely to shades of red in order to grab the user's attention. The information on the screen may be information relevant to the alert; for example, the screen could provide details of an overdue bill for the user of mobile device 100a. Alternatively, the color could be used to indicate other information, for example, a first color (e.g. red) could indicate that the bill is overdue on the mobile device that the user is holding, and a second color (e.g. blue) could indicate that another device that, the user is financially responsible for, has an overdue bill.

When the navigation area 205 with the alert symbol 405 is brushed over with an upward motion the processor 115 executing the application 135 may interpret this to dismiss the alert and animate the flip animation effect (as described below) to transition to the menu interface 235. Alternatively, when the processor 115, executing the application 135, detects the selection of the alert symbol 405 the processor 115 may interpret the selection as the user wanting to see more detail about the alert and the touch may be interpreted as an expand touch action. A further alternative would be to have the processor 115, when executing the application 135, configured to interpret a downward stroke as an expand touch action. The expand touch action may provide more detailed information about the alert.

Figure 5:
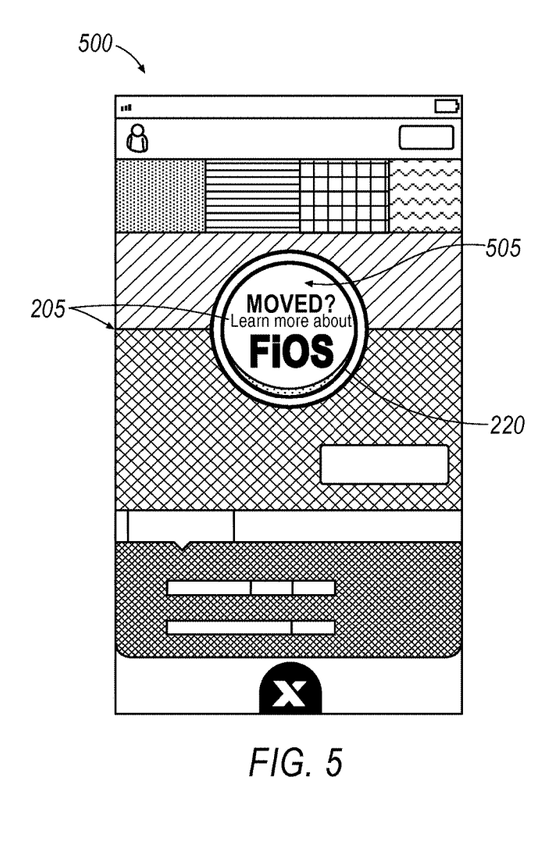
FIG. 5 illustrates a screen layout for the first exemplary illustration of the navigation area where the centrally disposed selection element shows an alert message.

FIG. 5 illustrates a screen layout 500 for the first embodiment of the navigation area 205 where the centrally disposed selection element 220 shows an alert, specifically an alert message 505 that may be produced by the processor 115 executing the application 135. The alert message 505 may be related to recent activity of the user of the mobile device 100a. For example if the user of the mobile device 100a recently updated their home or billing address then an alert may be displayed that is relevant to the new address. These contextual alerts can be used to provide the user with a more satisfying experience by providing alerts and message relevant to what is happening in their life. For example, the alert may be a message advertising cable TV service that available to the new home they have just moved into. An expansion touch action may be detected by the processor 115 executing the application 135 which may cause the navigation area to expand to the larger navigation area, for example larger navigation area 305, and display a more detailed alert message. The processor 115 executing the application 135 may detect, for example, an expansion touch action when the centrally disposed selection element 220 is selected or an upward or downward swipe occurs over a portion of the centrally disposed selection element 220.

Figure 6A:
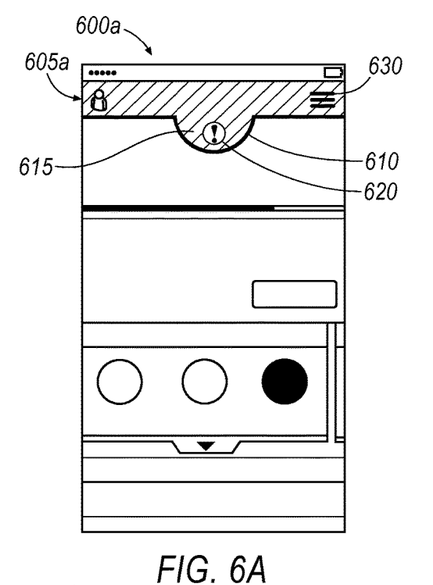
FIGS. 6A and 6B illustrate screen layouts showing a first alternative exemplary illustration.

FIG. 6A illustrates a screen layout 600A showing a first alternative exemplary illustration with a navigation area 605 located at the top of the screen with a half circle centrally disposed selection element 610 extending downward that may be produced by the processor 115 executing the application 135. The navigation area 605 may display a menu interface, as described above, or may display an alert, in this case an alert symbol 620. The processor 115 executing application 135 may detect an expand touch action, for example the alert symbol 620 is selected or a downward stroke is detected over some portion of the navigation area 605A. When the expand touch action is detected then a transition effect may be animated to expand the navigation area 605A to a larger navigation area 605B as shown in FIG. 6B.

Also included in the navigation area 605 may be a menu icon 630, with similar functionality to the selection of the menu icon 230 as described above in regards to the processor 115 executing application 135 detecting the expand touch action.

Figure 6B:
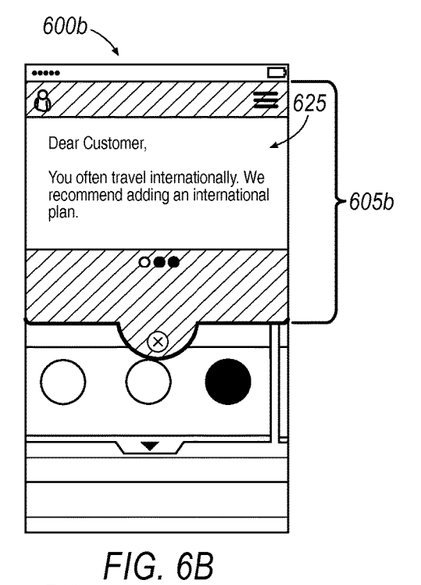

FIG. 6B illustrates a screen layout 600B showing the first alternative exemplary illustration with the larger navigation area 605B, which may be produced by the processor 115 executing application 135. The larger navigation area 605B provides an area to show a detailed alert message 625. For example, the alert symbol 620 when expanded may provide a message indicating that the user of the touchscreen 105 may benefit from a particular type of service like an international calling plan when it is determined that the user often travels internationally.

Figure 7A:
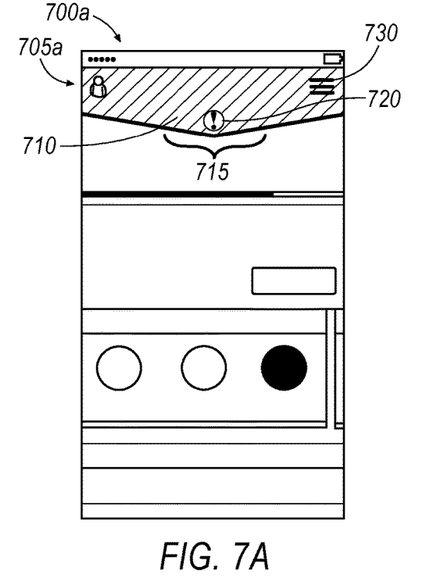
FIGS. 7A and 7B illustrate screen layouts showing a second alternative exemplary illustration.

FIG. 7A illustrates a screen layout 700A showing a second alternative exemplary illustration with a navigation area 705 located at the top of the screen with a descending triangular-shaped element 710, i.e. a generally centrally disposed selection element, which the processor 115 executing application 135 displayed. The navigation area 705 may display a menu interface 235, as described above, or may display an alert, in this case an alert symbol 715. The processor 115 executing application 135 may detect an expand touch action, for example the alert symbol 720 is selected or a downward stroke is detected over some portion of the navigation area 705A. When the expansion touch action is detected then processor 115 executing the application 135 may animate a transition effect to expand the navigation area 705A to a larger navigation area 705B as shown in FIG. 7B.

Also included in the navigation area 705 may be a menu icon 730, with similar functionality to the selection of the menu icon 230 as described above in regards to the processor 115 executing application 135 detecting the expand touch action.

Figure 7B:
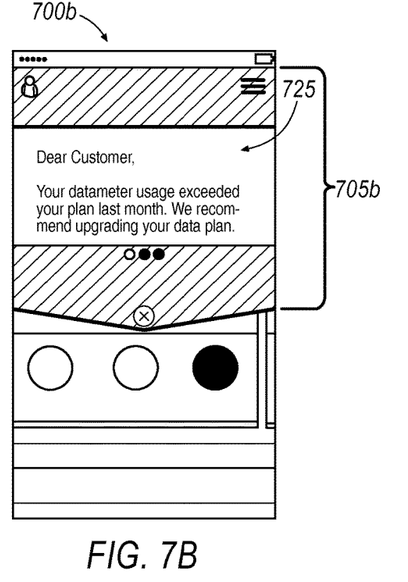

FIG. 7B illustrates a screen layout 700B showing the second alternative exemplary illustration with a larger navigation area 705B that may be produced by the processor 115 executing application 135. Larger navigation area 705B provides an area to show a detailed alert message 725. For example, the alert symbol 720 when expanded may provide a message indicating a recommended upgrade to the data plan based on exceeding the existing data plan's usage last month.

Figure 8A:
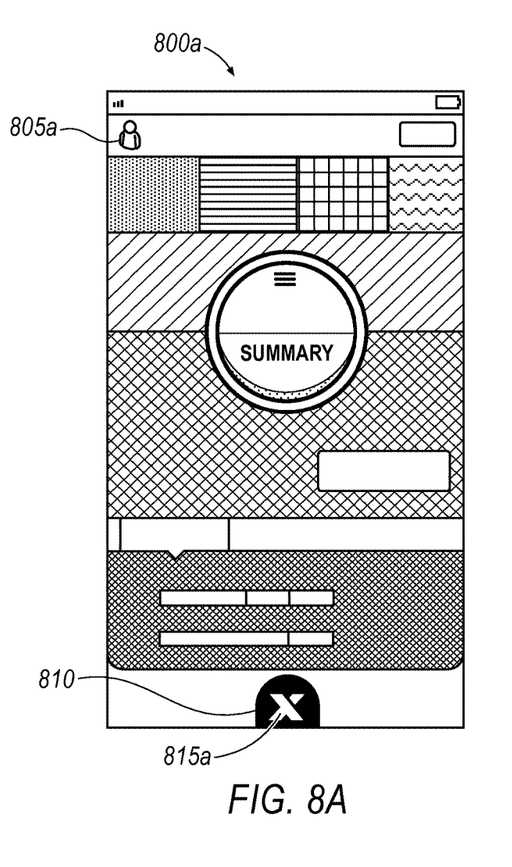
FIGS. 8A and 8B illustrate screen layouts showing application transition icons that allow a user to toggle between a first application and a second application.
Figure 8B:
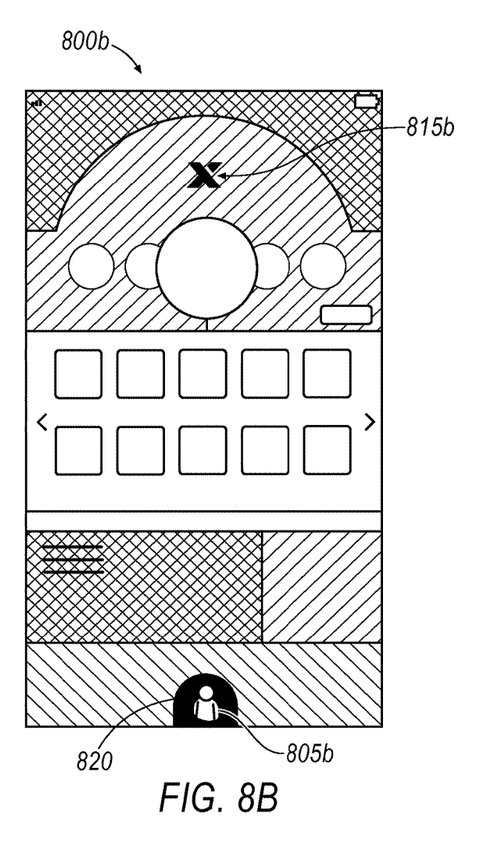

FIGS. 8A and 8B illustrate screens with application transition icons that allow a user to toggle between the first application 135 and the second application 140. The screen layout 800A may display at the top of the screen a first icon 805A, which corresponds to the first application 135. The first icon 805A provides an indication to the user of the application that the processor 115 is currently executing the first application 135. Displayed at the bottom of the screen is a border 810 extending up from the bottom of the screen containing a second transition icon 815A. For example, the border 810 may be in the shape of a rounded tab or a bubble. The processor 115 executing the application 135 may depict the second transition icon 815A in other ways at the bottom edge (or some other edge) of the screen, for example without a border 810. When the processor 115 is executing the first application 135 and detects a selection of the second transition icon 815A, indicating a transition application action, then the processor 115 will execute the second application 140.

The processor 115 executing the second application 140 may display the second icon 815B near the top of the screen, thus providing an indication to the user that the second application 140 is executing on the processor 115. The processor 115 executing the second application 140 may display the first transition icon 805B in a border 820 extending up from the bottom of the screen. For example, the border 820 may be in the shape of a rounded tab or a bubble. The processor 115 executing the second application 140 may depict the first transition icon 805B in other ways at the bottom edge (or some other edge) of the screen, for example without a border 820. When the processor 115 is executing the second application 140 and detects the selection of the first application icon 805B, indicating the transition application action, then the processor 115 may execute the first application 135.

The first transition icon 805B and the second transition icon 815A may be displayed on the bottom of the screen when the application is at a main menu. The second transition icon 815A is recognizable as the same symbol used in the second icon 815B, for example only varying in color, size or slightly in the details. The first transition icon 805B is recognizable as the symbol used in the first icon 805A, for example only varying in color, size or slightly in the details. The first transition icons 805A and 805B and/or the second transition icons 815A and 815B may vary for a variety of reasons, for example it may vary in color to be noticeable against a different background color, the size may vary in order to fit the available display area and a different size may alter some of the minor details that are depicted. In one embodiment, the background/adjacent color to the first transition icons 805A and 805B and/or the second transition icons 815A and 815B is determined and the first transition icons 805A and 805B and/or the second transition icons 815A and 815B automatically vary in color to be noticeable against the background/adjacent color.

Figure 9:
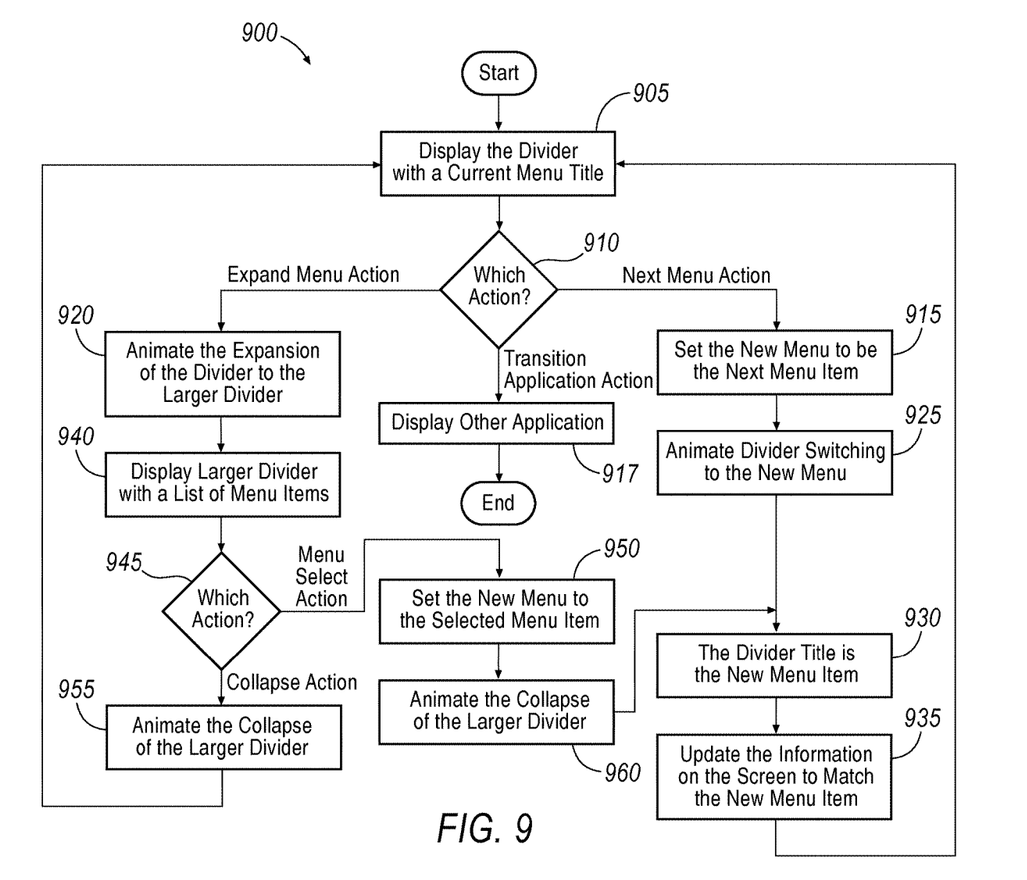
FIG. 9 illustrates an exemplary process flow for the visual application menu navigation system.
Figures 10A, 10B:
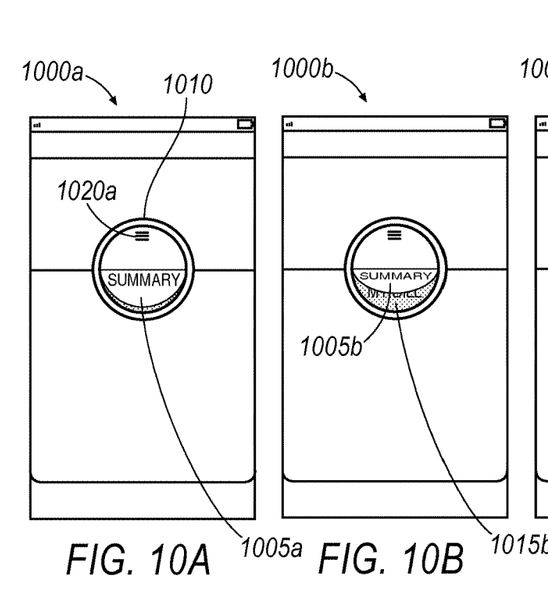
FIGS. 10A-E illustrate a flip animation effect of the centrally disposed selection element.
Figures 10C, 10D:
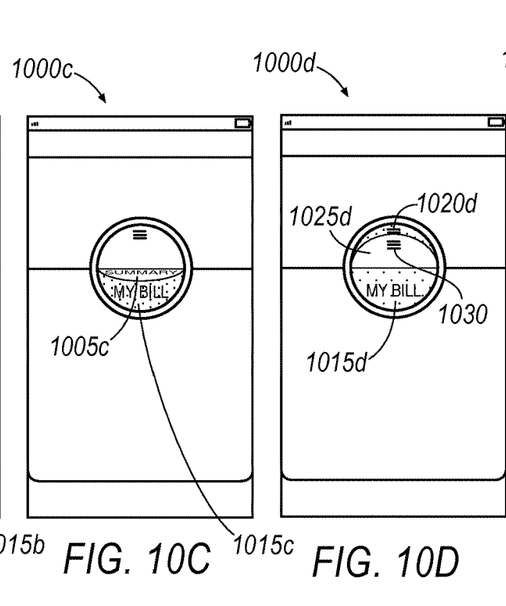
Figure 10E:
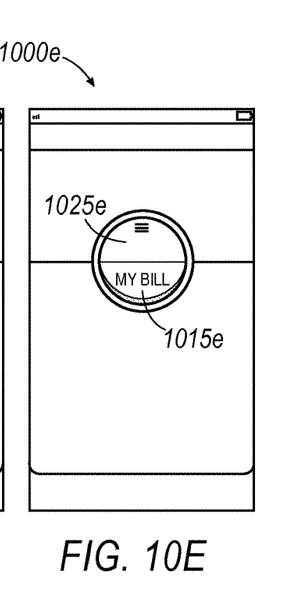

FIG. 9 illustrates a flowchart of an exemplary process 900 that may be used by computing device 110 when the processor 115 when executing an application including the visual application navigation.

At block 905 the computing device 110 may display a navigation area with a current menu item title.

At decision diamond 910, when a touch action has been indicated on touchscreen 105, the computing device 110 may determine if the touch action was a next menu touch action, an expand menu touch action or a transition application action. If the touch action was a next menu touch action then the computing device 110 may proceed to block 915. If the touch action was an expand menu touch action then the computing device 110 may proceed to block 920. If the touch action was the transition application action then the computer device 110 may proceed to block 917.

At block 915, the computing device 110 may set the new menu to be the next menu item.

At block 925, the computing device 110 may animate the navigation area switching to the new menu.

At block 930, the computing device 110 may display on the screen the next menu item in the navigation area.

At block 935, the computing device 110 may update the information on the screen to match the new menu item.

At block 920, the computing device 110 may animate the expansion of the navigation area into the larger navigation area, for example from the navigation area 205 to the larger navigation area 305.

At block 940, the computing device 110 may display the larger navigation area with the list of menu items 145.

At decision diamond 945, a touch action has been detected as being indicated on the touch screen 105 and the computing device 110 may determine if the touch action was a menu select touch action or a collapse touch action. If the touch action was a menu select touch action then the computing device 110 may proceed to block 950. If the touch action was a collapse touch action then the computing device 110 may proceed to block 955.

At block 950, the computing device 110 may set the new menu to be the selected menu item.

At block 960, the computing device 110 may animate the collapse of the larger navigation area back to the navigation area, for example from the larger navigation area 305 to the navigation area 205.

At block 955, the computing device 110 may animate the collapse of the larger navigation area back to the navigation area, for example from the larger navigation area 305 to the navigation area 205.

At block 917, the computer device 110 may display the other application, for example the second application 140.

FIGS. 10A-E illustrate the flip animation effect of a centrally disposed selection element, 1005c-e. The animation starts after a next menu touch action, for example the next menu touch action may be defined as tapping on the bottom portion 1005a of the centrally disposed selection element 1010. The menu may start out on the "SUMMARY" menu, as can be seen in user input display 1000a, with a menu select icon 1020a. Next, the tab 1005a starts to flip upwards as shown in user input display 1000b, parts of the next menu 1015b may start to become visible as the bottom tab 1005b starts to rotate upwards. Continuing, in user input display 1000c the menu tab 1005c continues to flip upwards until it is approaching the halfway point and the old "SUMMARY" is barely discernible and the new menu "MY BILL" 1015c starts to come into clear view although it may still remain in the shadow of the old "SUMMARY" tab 1005c. Once the tab passes the halfway point than the backside of the tab 1025 starts to come into view with a new menu selection icon 1030 that can be seen starting to land top of the previous menu select icon 1020d and the "MY BILL" is fully visible and in less of a shadow. Finally, as the backside 1025e of the old "SUMMARY" tab becomes flush with the surface the new "MY BILL" tab 1005e is in clear view and lifts off the surface giving the appearance of a tab ready to flip upwards as depicted in user input display 1000e.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile device comprising:
a processor;
a touch-activated graphical user interface, coupled to the processor; and
a memory that stores an application executable by the processor;
wherein said processor is configured to:
execute said application to respond to at least one user touch entry via the user interface;
activate said at least one user touch entry via user touch of a graphic selection element that is disposed by the processor substantially centrally on the user interface to facilitate centralized user touch access, the graphic selection element displaying at least a menu interface having a top portion including one of a menu icon or a home icon, and a bottom portion including a current menu title;
in response to a user touch on at least a portion of the top portion to select a menu option associated with the current menu title displayed in the bottom portion, activating an animated process in which the top portion and the bottom portion move in opposite directions to expand a navigation area from a collapsed state to an expanded state in which the selected menu option including a list of menu items is displayed; and
in response to a user touch on at least a portion of the bottom portion, activating an animated process within the graphic selection element.

2. The mobile device of claim 1, wherein said processor executes the application to:
display in the navigation area a menu item selected from said list of menu items.

3. The mobile device of claim 1, wherein the navigation area comprises a border between an upper area and a lower area, such border graphically bisecting said user interface.

4. The mobile device of claim 1, wherein said graphic selection element is at least partially circular or elliptical in shape.

5. The mobile device of claim 1, wherein said graphic selection element provides a visual, audible or vibrational alert to notify of a presence of a user message.

6. The mobile device of claim 5, wherein the user message comprises an advertisement or billing message.

7. The mobile device of claim 1, wherein the user touch on the at least a portion of the top portion includes at least one of a downward stroke and a touch on the menu icon.

8. The mobile device of claim 1, wherein the animated process within the graphic selection element includes a flip animation giving an appearance of the bottom portion flipping upward to display a next menu title in the bottom portion.

9. The mobile device of claim 1, wherein the animated process caused by the user touch on the at least a portion of the top portion includes the menu icon transitioning to the home icon, and at least one of a user touch on the home icon and an upward stroke anywhere on the user interface, including in the navigation area, causes the processor to automatically activate an animated process in which the top portion and the bottom portion move back together to collapse the navigation area from the expanded state to the collapsed state.

10. The mobile device of claim 1, wherein in the collapsed state, the navigation area is collapsed into a line, and in the expanded state, the navigation area is generally rectangular.

11. A method comprising:
executing by a processor an application to respond to at least one user touch entry via a touch-activated graphical user interface of a mobile device;
activating said at least one user touch entry via user touch of a graphic selection element that is disposed by the processor centrally at least in part on the user interface, the graphic selection element displaying at least a menu interface having a top portion including one of a menu icon or a home icon, and a bottom portion including a current menu title;
in response to a user touch on at least a portion of the top portion to select a menu option associated with the current menu title displayed in the bottom portion, activating by the processor graphically an animated process in which the top portion and the bottom portion move in opposite directions to expand a navigation area from a collapsed state to an expanded state in which the selected menu option including a list of menu items is displayed in response to a user touch on at least a portion of the top portion; and
activating by the processor graphically an animated process within the graphic selection element in response to a user touch on at least the bottom portion.

12. The method of claim 11 further comprising:
displaying by the user interface in the navigation area a menu item selected from said list of menu items.

13. The method of claim 11, wherein a border disposed in the navigation area between a first area and a second area graphically bisects said user interface.

14. The method of claim 11, wherein, said graphic selection element is circular at least partially in shape.

15. The method of claim 11, wherein said graphic selection element provides a visual, audible or vibrational alert to notify of a presence of a user message.

16. The method of claim 15, wherein the user message comprises an advertisement or billing message.

17. The method of claim 11, wherein the user touch on the at least a portion of the top portion includes at least one of a downward stroke and a touch on the menu icon.

18. A non-transitory computer readable medium tangibly embodying computer-executable instructions that when executed by a processor cause the processor to perform operations comprising:
   executing by a processor an application to respond to at least one user touch entry via a touch-activated graphical user interface of a mobile device;
   activating said at least one user touch entry via user touch of a graphic selection element that is at least in part centrally disposed by the processor on the user interface, the graphic selection element displaying a menu interface having a top portion including one of a menu icon or a home icon, and a bottom portion including a current menu title;
   in response to a user touch on at least a portion of the top portion to select a menu option associated with the current menu title displayed in the bottom portion, activating by the processor graphically an animated process in which the top portion and the bottom portion move in opposite directions to expand a navigation area from a collapsed state to an expanded state in which the selected menu option including a list of menu items is displayed in response to a user touch on at least a portion of the top portion; and
   activating by the processor graphically an animated process within the graphic selection element in response to a user touch on at least the bottom portion.

19. The medium of claim 18 further comprising:
   displaying by the user interface in the navigation area a menu item selected from said list of menu items.

20. The medium of claim 18, wherein a border is disposed in the navigation area between a first area and a second area, and thereby graphically bisects said user interface.

21. The medium of claim 18, wherein said graphic selection element is circular at least partially in shape.

* * * * *